US009352262B2

(12) United States Patent
Jodi et al.

(10) Patent No.: US 9,352,262 B2
(45) Date of Patent: May 31, 2016

(54) SCAVENGE TUBE ARRANGEMENT; GAS LIQUID SEPARATOR FILTER ASSEMBLY; AND METHODS

(71) Applicant: Donaldson Company, Inc., Minneapolis, MN (US)

(72) Inventors: Wijadi Jodi, Burnsville, MN (US); Marvin Laue, Belle Plaine, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 47 days.

(21) Appl. No.: 14/208,532

(22) Filed: Mar. 13, 2014

(65) Prior Publication Data
US 2014/0331624 A1    Nov. 13, 2014

Related U.S. Application Data

(60) Provisional application No. 61/787,486, filed on Mar. 15, 2013, provisional application No. 61/787,609, filed on Mar. 15, 2013.

(51) Int. Cl.
*B01D 46/00* (2006.01)
*B01D 46/42* (2006.01)
*B01D 46/24* (2006.01)

(52) U.S. Cl.
CPC ............... *B01D 46/42* (2013.01); *B01D 46/002* (2013.01); *B01D 46/0004* (2013.01); *B01D 46/0031* (2013.01); *B01D 46/2411* (2013.01); *B01D 2275/10* (2013.01); *Y10T 29/49604* (2015.01)

(58) Field of Classification Search
CPC ........... B01D 46/0031; B01D 46/2411; B01D 46/42; B01D 46/24
See application file for complete search history.

(56) References Cited

U.S. PATENT DOCUMENTS

| 2,531,765 | A | 11/1950 | Burress |
| 4,203,739 | A | 5/1980 | Erdmannsdörfer |
| 4,233,042 | A | 11/1980 | Tao |
| 5,643,446 | A | 7/1997 | Clausen et al. |
| 5,800,584 | A | 9/1998 | Hinderer et al. |
| 6,409,804 | B1 | 6/2002 | Cook et al. |
| 6,485,535 | B1 * | 11/2002 | Linnersten ......... B01D 46/0004 55/319 |
| 6,500,243 | B2 | 12/2002 | Cook et al. |

(Continued)

FOREIGN PATENT DOCUMENTS

| EP | 0 278 772 A1 | 8/1988 |
| EP | 1695753 B1 | 2/2006 |
| WO | WO 03/002233 | 1/2003 |

OTHER PUBLICATIONS

International Search Report and Written Opinion for PCT/US2014/026694 mailed Sep. 10, 2014.

*Primary Examiner* — Robert Clemente
(74) *Attorney, Agent, or Firm* — Andrew F. Johnson

(57) ABSTRACT

A scavenge tube is slidably attached to either a filter head housing or a liquid return port in a wall of a vessel. The scavenge tube can be slidably positioned to ensure that the tube is oriented within the area where the collected liquid will pool. In one example, the scavenge tube is slidably attached to the housing by way of being spring-biased. A slidable grounding tube is attached to an electrically grounded filter head housing and projects into a liquid collection region of a filter member and is in touching engagement with a metal portion of the filter member to ground the filter member to the filter head. In one example, the slidable grounding tube is spring-biased.

17 Claims, 11 Drawing Sheets

(56) References Cited

U.S. PATENT DOCUMENTS

| | | | |
|---|---|---|---|
| 7,097,683 B2 * | 8/2006 | Eppel | B01D 46/0031 55/423 |
| 7,531,018 B2 * | 5/2009 | Becker | B01D 45/08 55/337 |
| 7,588,615 B2 * | 9/2009 | Gillenberg | B01D 27/08 55/423 |
| 7,628,280 B2 | 12/2009 | Mandt et al. | |
| 8,080,080 B2 * | 12/2011 | Becker | B01D 45/06 55/320 |
| 8,152,887 B2 | 4/2012 | Patel | |
| 2005/0044827 A1 | 3/2005 | Eppel et al. | |
| 2006/0123744 A1 | 6/2006 | Read | |
| 2006/0201871 A1 * | 9/2006 | Gillenberg | B01D 27/08 210/450 |
| 2007/0240391 A1 | 10/2007 | Becker et al. | |
| 2008/0257161 A1 | 10/2008 | Read | |

* cited by examiner

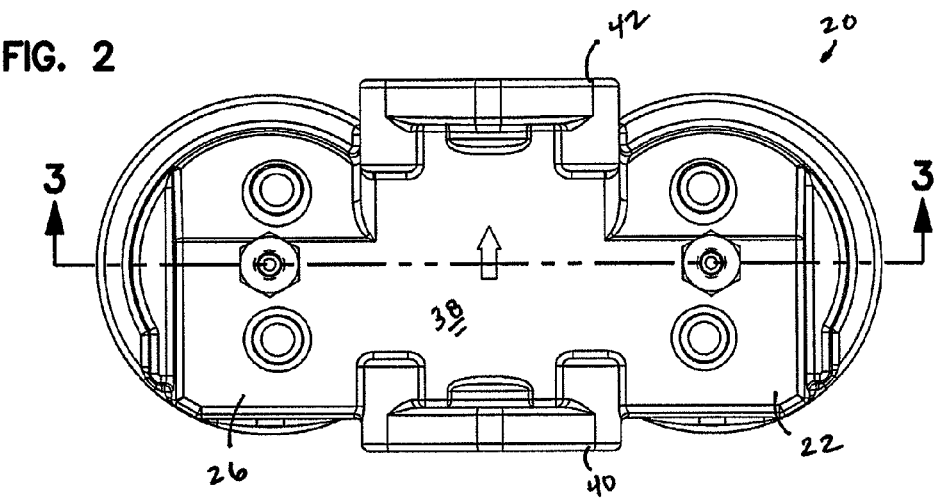
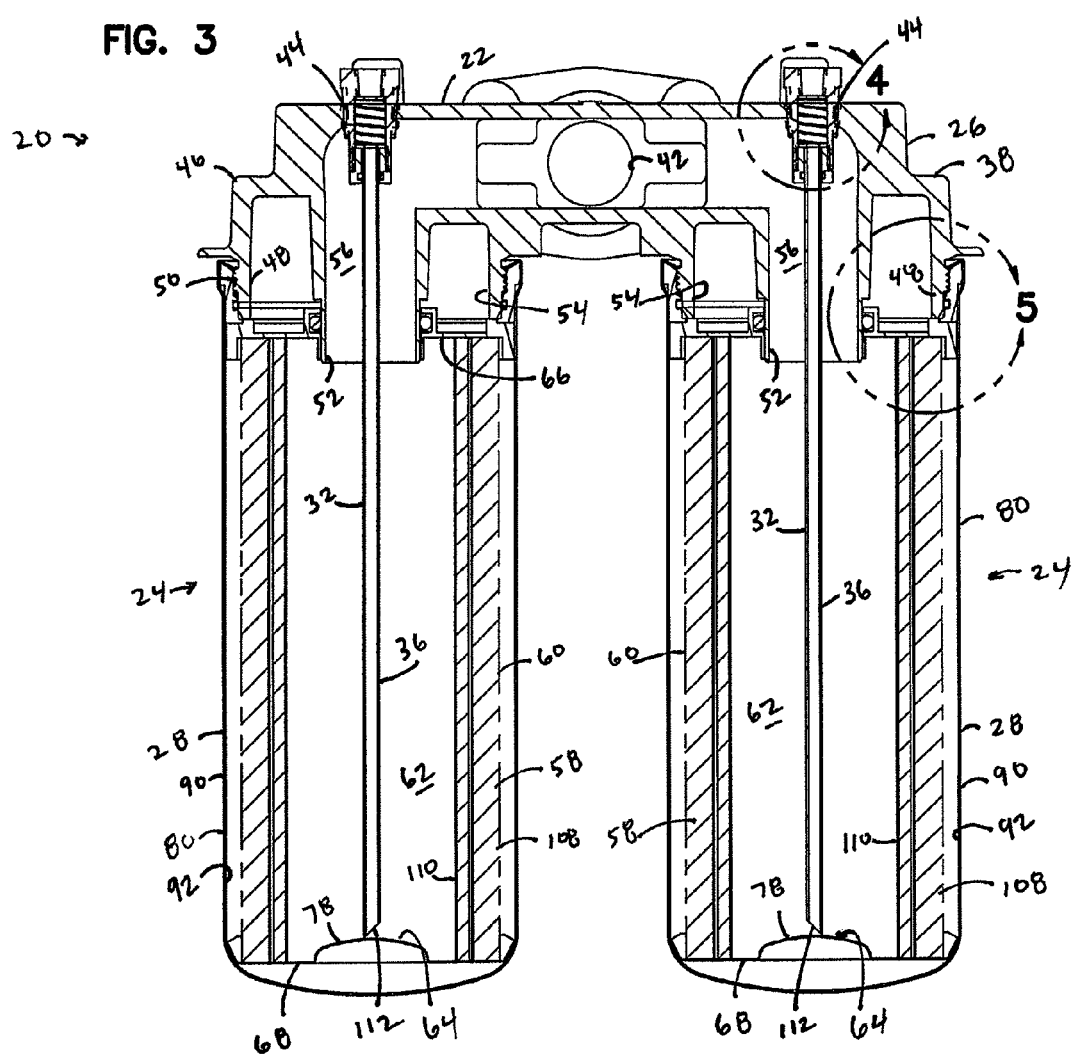

SCAVENGE TUBE ARRANGEMENT; GAS LIQUID SEPARATOR FILTER ASSEMBLY; AND METHODS

CROSS REFERENCE TO RELATED APPLICATIONS

This application claims priority to U.S. provisional patent application 61/787,486, filed Mar. 15, 2013, and U.S. provisional patent application 61/787,609, filed Mar. 15, 2013, incorporated herein by reference in their entirety.

TECHNICAL FIELD

This disclosure relates generally to gas liquid separator arrangements, components thereof, and methods. More particularly, this disclosure relates to a scavenge tube arrangement for use in a gas liquid separator assembly, and methods of assembly and use, including in air/oil separator filters for air compressor systems.

BACKGROUND

Gas liquid separator arrangements are used in various environments. In one example, gas liquid separator arrangements are used in conventional air compressor systems. In air compressor systems, air is compressed in a compression chamber, and a lubricant, such as oil, is injected into the compression chamber and mixes with the compressed air. The oil is used for various reasons including cooling the system, lubricating bearings, balancing forces, and providing seals for rotary screws, if the system is a rotary screw system. The oil should be removed from the stream of compressed air before the compressed air is used downstream for tools or pneumatic equipment.

In some conventional arrangements, the compressed air and oil mixture is discharged from the compressor and flows with a high velocity into a separator tank where the air and oil of the mixture are separated. Various types of separator arrangements have been used. In many systems, after the oil is separated from the air/oil mixture, gravity causes most of the oil to drain downwardly into a lower portion of the separation chamber, while the air flows upwardly into an upper portion of the separation chamber. The drained or coalesced oil collects in a bottom portion of the separator and is returned to the compressor by a scavenge tube.

Improvements in these types of systems are desirable.

SUMMARY

In many instances, it is desirable that the scavenge tube is always in contact with the collected oil. Therefore, in one aspect, a scavenge tube that is slidably attached to either a filter head housing or a liquid return port in a wall of a vessel is provided. The scavenge tube can be slidably positioned to ensure that the tube is oriented within the area where the collected liquid will pool.

In one example, the scavenge tube is slidably attached to the housing by way of being biased with a biasing mechanism.

The biasing mechanism can be a spring.

In many systems, it can be desirable to ground a filter member to an attached filter head. In one aspect, therefore, a filter assembly is provided in which a slidable grounding tube is attached to an electrically grounded filter head housing and projects into a liquid collection region of a filter member and is in touching engagement with a metal portion of the filter member to ground the filter member to the filter head.

In one example, the slidable grounding tube is biased with a biasing mechanism.

In another aspect, a filter head for a gas liquid separator filter cartridge includes a housing having an inlet arrangement to convey gas to be filtered, an outlet arrangement to convey filter gas, at least one mounting stub adapted to receive a filter member for filtering the gas, and a liquid return port. The filter head also includes a scavenge tube slidably attached to the housing and in communication with the liquid return port.

In one example, the scavenge tube is a biased scavenged tube.

In another aspect, a gas liquid filter assembly is provided and includes a filter member having a liquid collection region. A filter head as characterized above is removably secured to the filter member. The scavenge tube is slidably attached to the filter head housing and is in communication with the liquid return port, while the scavenge tube projects into the liquid collection region of the filter member.

In one example, the gas liquid filter assembly includes a biased scavenge tube.

In another aspect, a method for assembling a gas liquid separator assembly includes providing a filter head include a filter head housing with an inlet arrangement, an outlet arrangement, at least one mounting stub, and a liquid return port. The method can include operably mounting a filter member onto the mounting stub, and the filter member includes a closed end. The method can include, while mounting the filter member onto the mounting stub, engaging a scavenge tube attached to the filter head housing against the closed end of the media pack and against a slidable connection with the filter head housing.

In one example, the step of engaging a scavenge tube and against a slidable connection includes engaging the scavenge tube against a biasing mechanism, such as a spring, secured to the filter head housing.

In another aspect, a scavenge tube arrangement for use in a gas liquid separator filter is provided. The scavenge tube arrangement includes a fitting having opposite open ends and an open interior there between. A scavenge tube is slidably held within the open interior. A seal member is held by the fitting and forms a seal between the scavenge tube and the fitting.

In one example, there is also a biasing mechanism, such as a spring, operably held within the open interior of the fitting, and the scavenge tube is slidably held within the open tube and against the biasing mechanism.

It is noted that not all the specific features described herein need to be incorporated in an arrangement for the arrangement to have some selected advantage according to the present disclosure.

BRIEF DESCRIPTION OF THE DRAWINGS

FIG. 2 is a top view of the assembly of FIG. 1;

FIG. 3 is a cross sectional view of the assembly of FIG. 2, the cross section being taken along the line 3-3 of FIG. 2;

DETAILED DESCRIPTION

A. Embodiments of FIGS. 1-12

1. Filter Assembly 20

Figure 1:
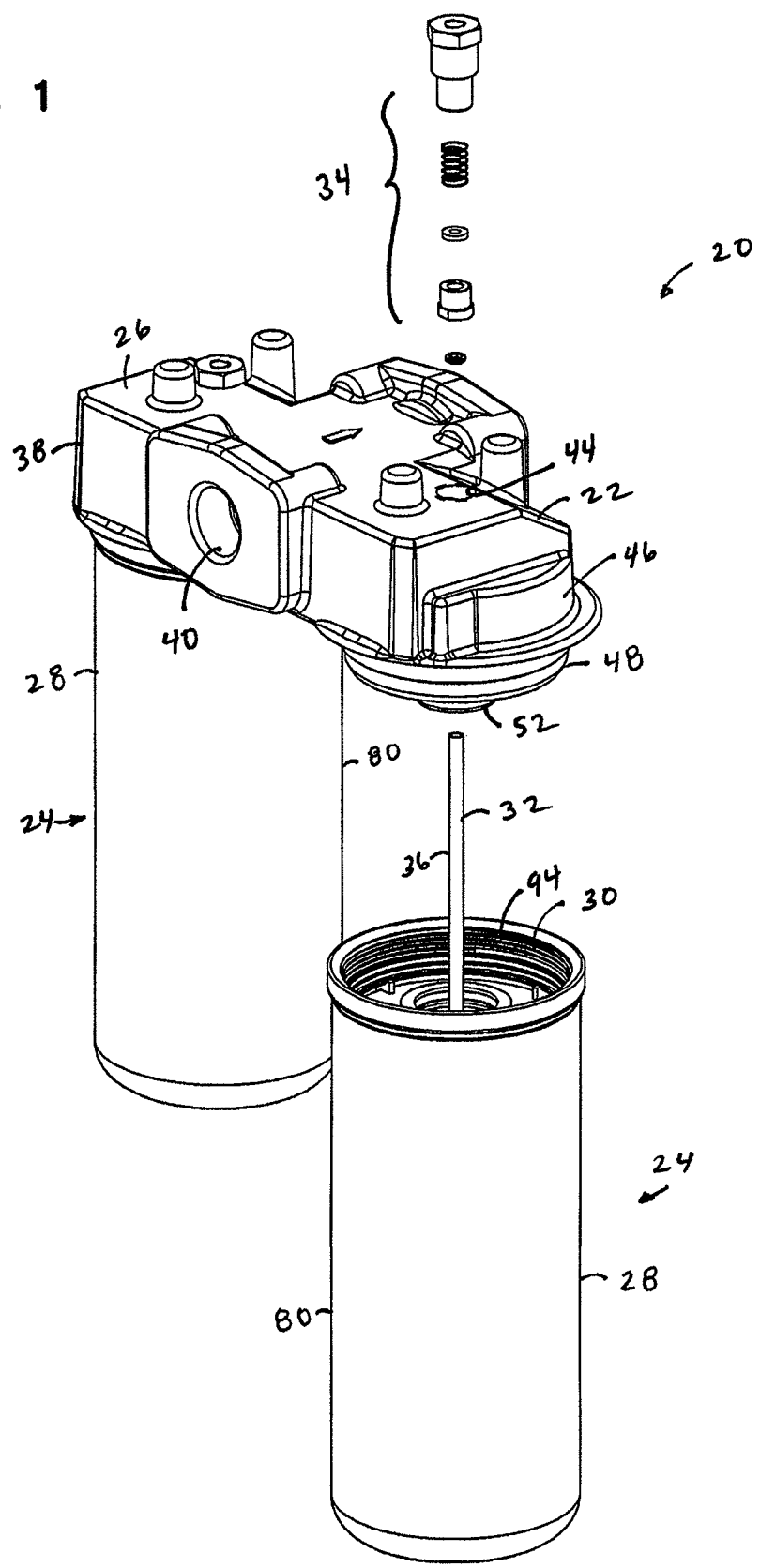
FIG. 1 is a perspective, partially exploded view of a first embodiment of a gas liquid filter assembly, constructed in accordance with principles of this disclosure.

Illustrated in FIG. 1 is a gas liquid filter assembly 20 embodying principles of this disclosure. In the example shown in FIG. 1, the filter assembly 20 includes a filter head 22 and a filter member 24. This particular example shows the filter head 22 as being a double head 26 accommodating two filter members 24. It should be understood that in other embodiments, the filter head 22 can be a single head 22 for a single filter member 24, or it can include accommodations for more than two filter members 24.

Figure 5:
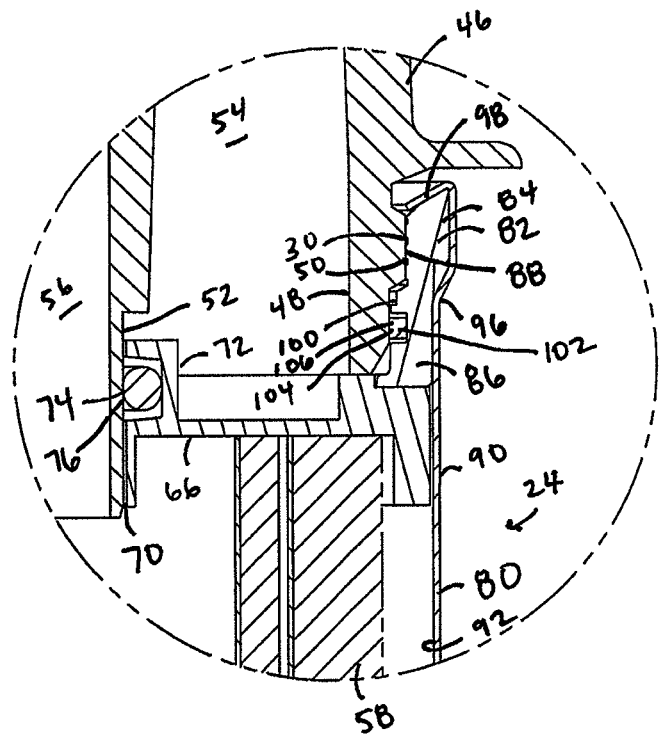
FIG. 5 is an enlarged view of the region 5-5 of FIG. 3.

The filter members 24 depicted in FIG. 1 are removable and replaceable from the filter head 22. In the embodiment shown, the members 24 are spin-on members 28, meaning that they connect to the filter head 22 by a threaded connection 30 (FIG. 5). While a spin-on filter member 28 is shown in this example, it should be understood that other types of filter members 24 are useable, including filter members that are replaceable within a reusable bowl.

The filter assembly 20 includes a scavenge tube 32. The scavenge tube 32 is attached to the filter head 22 and is usable to convey liquid that is collected within the filter assembly 20 and return the collected liquid back to the system using the liquid. In the example of a compressor, the collected liquid will be oil, and the oil will be returned back to the compressor by the scavenge tube 32.

FIG. 1 further illustrates components 34 used to attach the scavenge tube 32 to the filter head 22. Further details are described below.

Independent of the above, the filter assembly 20 can include a grounding tube 36. The grounding tube 36 is usable to ground the filter member 24 by providing a metal to metal connection between the metal filter head 22 and a metal portion of the filter member 24. In the example shown, the grounding tube 36 can also be the same thing as the scavenge tube 32. More details on operation of the grounding tube 36 are described below.

In reference now to FIGS. 2 and 3, the filter head 22, in the example shown, includes a housing 38. The housing 38 is typically a metal housing, cast or machined, and includes an inlet arrangement 40 (FIG. 1) to convey gas to be filtered. In the example of an air oil separator, the gas to be filtered is air, and the air will typically have oil entrained within it. The housing 38 has an outlet arrangement 42. The outlet arrangement 42 conveys the filtered gas. In the example of an air oil separator, the filtered gas is filtered air.

The housing 38 will typically include a liquid return port 44. The liquid return port 44 is a port that is used to return liquid that has collected within the filter member 24 back to the system using the liquid. In the example of an air oil separator, the liquid return port 44 returns oil that has been collected back to the system using the oil, such as a compressor.

The housing 38 includes an outer wall 46. Part of the outer wall 46 defines a mounting stub 48. The mounting stub 48 is where there is releasable connection with the filter member 24. In this embodiment, the mounting stub 48 includes external threads 50, which form part of the threaded connection 30 between the member 24 and the head 22.

The housing 38, in this embodiment, also includes an internal sealing surface 52 which receives a portion of the filter member 24.

Surrounding the sealing surface 52 and within the outer wall 46 is an unfiltered gas volume 54. The inlet arrangement 40 is in communication with the unfiltered gas volume 54.

The sealing surface 52 defines within it a filtered gas volume 56. The filtered gas volume 56 is in flow communication with the outlet arrangement 42.

When the filter member 24 is operably attached to the filter head 22, unfiltered gas, for example air entrained with oil, enters the filter head 22 through the inlet arrangement 40 and then into the unfiltered gas volume 54. From there, the unfiltered air flows through the filter member 24, where it is filtered, and exits the filter member 24 through the filtered gas volume 56 and then leaves the filter head 22 through the outlet arrangement 42.

In the example embodiment of FIG. 3, the filter head 22 has one outlet arrangement 42, which is in communication with the filtered gas volume 56 leading from both filter members 24.

The filter member 24 includes filter media 58. The media 58 is for filtering and cleaning the unfiltered gas of particulate and debris, and also to help remove liquid, such as oil droplets, from the gas.

Many different types of filter media 58 can be used. In this embodiment, the media 58 is in the shape of a tube 60 having an open filter interior 62. The media can be pleated media, or other types of media, such as depth media. This is discussed further below.

The filter member 24 has a liquid collection region 64. The liquid collection region 64 is where liquid that has been separated from the unfiltered gas and liquid mixture collects within the filter member 24. In this embodiment, the liquid collection region 64 is within the open filter interior 62. In this embodiment, the open filter interior 62 is also on the clean or filtered side of the media 58 and in fluid flow communication with the filtered gas volume 56.

Still in reference to FIG. 3, the filter member 24, in this particular embodiment, has first and second opposite end caps 66, 68. The filter media 58 extends between the first and second end caps 66, 68 and are attached thereto.

In reference now to FIG. 5, the first end cap 66, in this embodiment, has a central aperture 70. The first end cap 66 includes a projecting seal mount 72 thereon. In this example, the seal mount 72 is axially projecting. The seal mount 72 is configured to form an inwardly directed seal, such as a radial seal 74 against a seal surface 76 supported by the filter head 22 when the filter member 24 is disposed in position for use. In the example shown, the seal surface 76 is part of the outer surface of the sealing surface 52.

The second end cap 68 closes the filter interior 62 at the end opposite of the first end cap 66. Preferably, the second end cap 68 is made from a metallic material, when using the scavenge tube 32 as a grounding tube 36. In the embodiment shown, the second end cap 68 includes an inwardly extending projection 78. The projection 78 engages and is physically against the scavenge tube 32. The liquid collection region 64 is defined at a bottom surface by the second end cap 68 and can reach a level of volume that flows over the projection 78 to be in contact with the scavenge tube 32.

The filter member 24 includes a filter housing or shell 80. The shell holds the filter media 58 there within. The shell 80 includes a side wall 90 defining an interior 92 and an open end 94 (FIG. 1). The shell 80, in this example embodiment and in reference to FIG. 5, includes an inwardly directed shoulder 96 and a top lip 98.

In reference now to FIG. 5, in this embodiment, there is a top plate 82. The top plate 82 is non-removably secured within the shell 80. The top plate 82 includes an upper portion 84 and a lower portion 86.

The top plate upper portion 84 has an inwardly directed threaded region 88, which forms part of the threaded connection 30. The threaded region 88 has an inner diameter that is greater than an outer perimeter diameter of the media 58.

The top plate lower region 86 is positioned to engage, in axial overlap, the first end cap 66, to inhibit the media 58 from being removed from the shell 80.

The threaded region 88 of the top plate upper portion 84 is positioned between the top lip 98 and the shoulder 96 of the shell 80. The top plate 82 also includes a second region 100 that extends axially away from the threaded region 88.

A gasket 102 is provided. In the embodiment shown, the gasket 102 is held within the second region 100 of the top plate 82 and forms a seal 104 against a seal surface 106 of the filter head 22. In this case, the seal surface 106 is formed by the outer wall 46.

The first end cap 66 and the media 58 are not sealed or otherwise attached to the top plate 82, in the example shown. The connection of FIG. 5 is described in commonly assigned U.S. Patent Publication US 2007/059238, incorporated herein by reference.

The media 58 can include media such as described in U.S. 2006/0123744; U.S. Pat. No. 6,093,231; U.S. Pat. No. 6,136,016; WO 99/47211; WO 99/43412; UK 1,603,519; U.S. Pat. No. 6,419,721; and U.S. Pat. No. 4,836,931, the complete disclosures of which are incorporated herein by reference. The principles of these types of arrangements can, for example, be applied for separator units herein.

The media 58 can include an upstream coalescing stage 108. The coalescing stage 108, in this arrangement, surrounds a downstream drain stage 110. Various liner structures or scrim structures to facilitate assembly or operation can be used. In general, in the coalescing stage 108, fine liquid particles carried in the gas stream coalesce. The coalesced liquid particles generally are driven into the drain stage 110, and then drained from the drain stage 110 into the liquid collection region 64. The scavenge tube 32 projects into the liquid collection region 64 for collecting the liquid therein and returning it for use.

In reference to FIG. 3, in the embodiment shown, the filter head 22 has two mounting stubs 48, each adapted to receive a filter member 24 for filtering the gas. Also in this embodiment, the filter head 22 includes a second liquid return port 44 in the housing 38 of the filter head 22. It should be understood that in other embodiments, there can be only a single filter member 24 with a filter head 22 that is configured for receiving only a single filter member 24; or there can be more than two filter members 24 and a filter head 22 configured for receiving more than two filter members 24.

As mentioned above, there is a scavenge tube 32. The scavenge tube 32 is slideably attached to the housing 38 of the filter head 22 and in communication with the liquid return port 44. By the term "slideably attached", it is meant that the scavenge tube 32, while being secured to the filter head 22, is allowed to move or slide relative to the housing 38. In this manner, it can be assured that an inlet end 112 of the scavenge tube 32 will be long enough and always in engagement with the liquid collection region 64 of the filter member 24. In particular, the inlet end 112 will be in touching engagement with the second end cap 68. In the example shown, the inlet end 112 will be in touching engagement and against the projection 78 of the second end cap 68. This engagement can be assured because when the filter member 24 is being connected to the filter head 22, the user can slide the scavenge tube 32 axially outwardly from the filter head 22 to a position that is longer than a position that would just touch the second end cap 68. Then, as the filter member 24 is secured to the filter head 22, and the second end cap 68 engages against the inlet end 112 of the scavenge tube 32, the scavenge tube 32 can be pushed axially in a direction toward the filter head 22 since it slides within its slideable attachment.

The scavenge tube 32 in the embodiment of FIGS. 1-12 is slideably attached to the housing 38, in addition to having a biasing mechanism. The biasing mechanism can be various types of mechanically assisted bias forcing mechanism, including, for example, a spring, including coil springs, helical springs, torsion springs, leaf springs, etc.; a ball bearing with air assist, similar to a check valve.

In the embodiment of FIGS. 13-16, described below, the scavenge tube 32 is slideably attached to the housing 38. In that embodiment, the scavenge tube 32 does not having a biasing mechanism.

The scavenge tube 32, in the embodiment of FIGS. 1-3, is located within the outlet arrangement 42 of the housing 38 of the filter head 22. In other embodiments that do not include a filter head 22, this location varies.

Preferably, the scavenge tube 32 is attachable and does attach to the housing 38 of the filter head 22. In other embodiments that do not include a filter head 22, this location varies.

Figure 4:
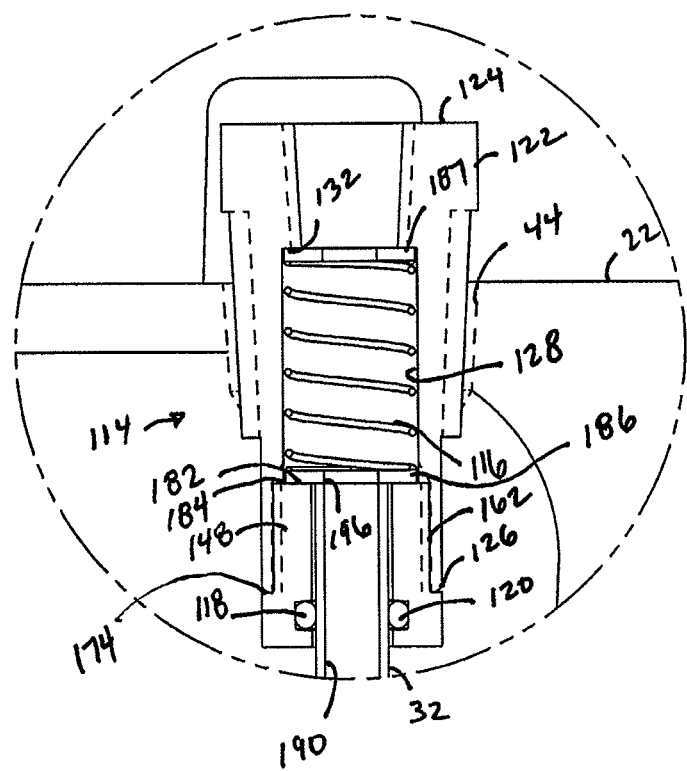
FIG. 4 is an enlarged view of the region 4-4 shown in FIG. 3.

Preferably, the scavenge tube 32 is attachable and does attach to the housing 38 of the filter head 22 by a fitting 114 (FIG. 4). The fitting 114 holds the scavenge tube 32. In embodiments, such as the embodiment of FIGS. 1-12, the fitting 114 also holds a spring 116. The spring 116 helps to bias the scavenge tube 32 in a direction toward and against a portion of the filter member 24. In the example shown, the spring 116 biases the scavenge tube 32 toward and against the second end cap 68. In a further example, the spring 116 biases the scavenge tube 32 toward and against the projection 78 of the second end cap 68.

In preferred embodiments, there is a seal member 118 to form a removable seal between the fitting 114 and the scavenge tube 32. In the embodiment shown, the seal member 118 is held by the fitting 114.

In one example, the seal member 118 is an O-ring seal member 120.

Figure 8:
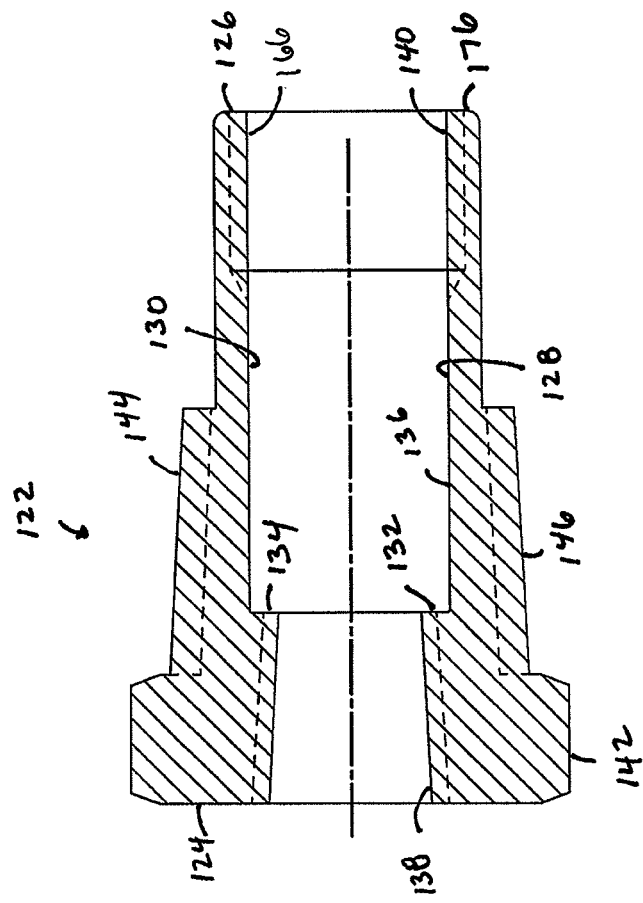
FIG. 8 is a cross sectional view of the first sleeve of the scavenge tube arrangement, the cross section being taken along the line 8-8 of FIG. 7.

In many preferred arrangements, the fitting 114 includes at least a first sleeve 122. In an example shown in FIGS. 4, 7, and 8, the first sleeve 122 has opposite first and second ends 124, 126. Between the first and second ends 124, 126 is an open interior 128 (FIG. 8). In the embodiment shown in FIG. 8, the open interior 128 forms a tube 130, with open opposite ends.

In the example embodiment shown and in reference to FIG. 8, the first sleeve 122 has a spring-seat 132. In the example depicted, the spring-seat 132 is formed by an inner projecting ledge 134, projecting inwardly in the open interior 128 from an inner wall 136 of the first sleeve 122. The spring 116 is oriented or mounted in the interior 128 of the first sleeve 122 and on the spring-seat 132.

Still in reference to FIG. 8, the first sleeve 122, in the example shown, has in the open interior 128, a first diameter region 138, and a second diameter region 140. The first diameter region 138 is smaller than the second diameter region 140. Separating the first diameter region 138 and second diameter region 140 is the ledge 134 forming the spring-seat 132. Typically, for example, the first diameter region 138 accommodates a hose or other conduit, which is connected to the equipment for returning the collected liquid by way of the scavenge tube 32. The second diameter region 140 holds at least the spring 116. The scavenge tube 32 can pass through a portion or all of the second diameter region 140.

Figure 7:
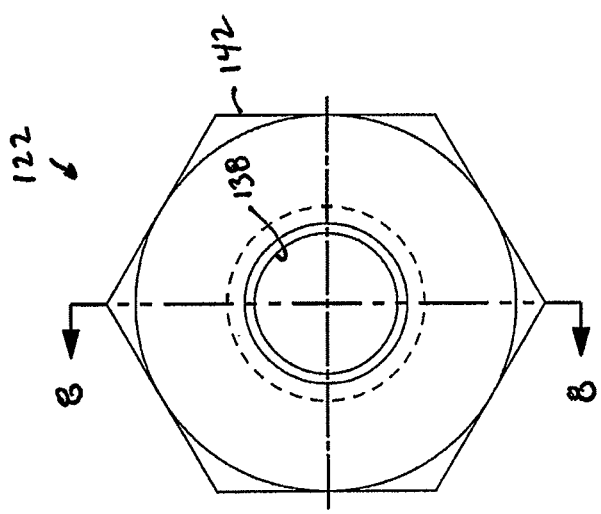
FIG. 7 is a top view of a first sleeve that is part of the scavenge tube arrangement of FIG. 6.

In FIG. 7, it can be seen how in this example embodiment, the first sleeve 122 has a head 142 suitable for engagement with a tool, such as a wrench. In FIG. 7, the head 142 is shown to be hexagonal. Of course, other shapes can be used in other embodiments.

The outer wall 144 of the first sleeve 122 reduces in dimension as it extends from first end 124 to second end 126. This can be seen in FIG. 8. In particular, adjacent to the head 142, the outer wall 144 is tapered along a section 146. The tapered section 146 extends partially from the head 142 to a location roughly 50% of the overall length of the first sleeve 122. This tapered section 146 helps to securely position the fitting 114 within the liquid return port 44.

In preferred arrangements, the fitting 114 further includes a second sleeve 148. In the embodiment shown, the second sleeve 148 is attached to the first sleeve 122. In the example shown, the second sleeve 148 is attached to the second end 126 of the first sleeve 122. The second sleeve 148 has an open interior 150 sized to removably accommodate the scavenge tube 32.

In preferred arrangements, the second sleeve 148 holds and accommodates the seal member 118. An example can be seen in FIG. 4.

Figure 9:
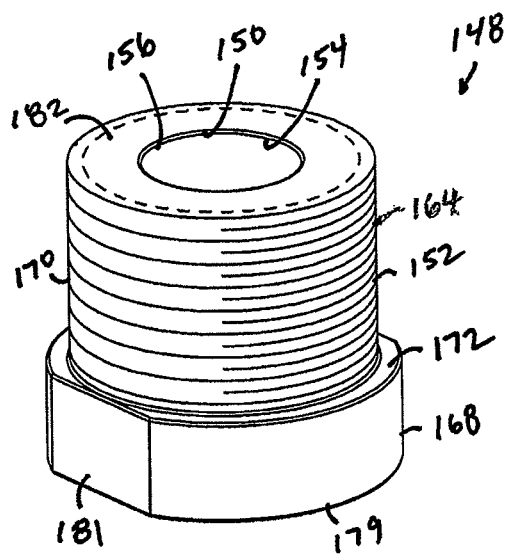
FIG. 9 is a perspective view of a second sleeve used in the scavenge tube arrangement of FIG. 6.
Figure 10:
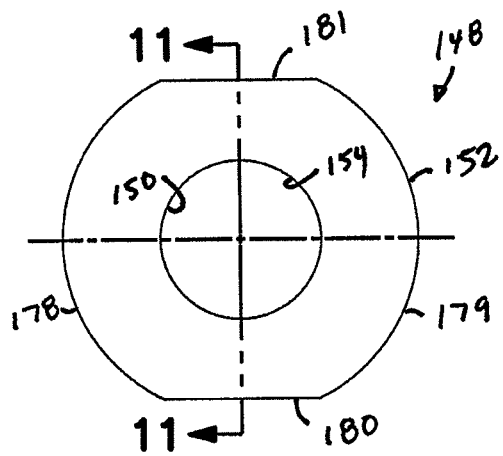
FIG. 10 is a bottom view of the second sleeve of FIG. 9.
Figure 11:
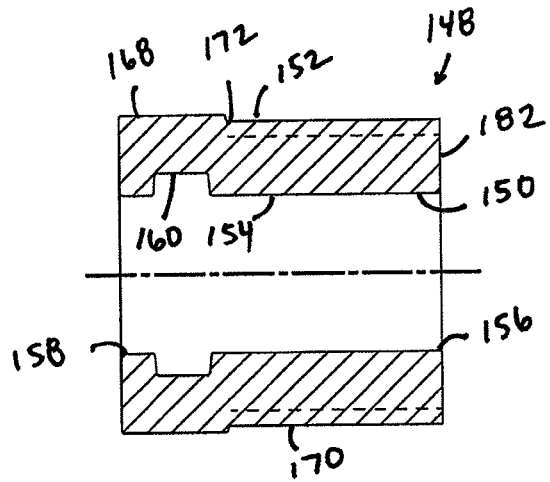
FIG. 11 is a cross sectional view of the second sleeve of FIGS. 9 and 10, the cross section being taken along the line 11-11 of FIG. 10.

FIGS. 9-11 show further details of one example embodiment of the second sleeve 148. In the example shown, the second sleeve 148 includes an exterior wall 152 and an interior wall 154. The interior wall 154 defines the open interior 150. In general, the open interior 150 forms a tube with two opposite open ends 156, 158. Within the open interior 150, the interior wall 154 includes an inwardly extending region 160 for holding the seal member 118.

The second sleeve 148 includes a connection mechanism for connecting the second sleeve 148 to the first sleeve 122. While a variety of mechanisms are usable, in the example shown, there is a threaded connection 162 between the first sleeve 122 and second sleeve 148.

In an alternate embodiment, not shown, the connection mechanism for connecting the second sleeve 148 to the first sleeve 122 can be either a press fit or an interference fit. Other connection mechanisms are also contemplated, for example, a projection fit within a mating slot, a sealant, an adhesive, etc.

In the example shown, the external wall 152 of the second sleeve 148 has externally directed threads 164. The threads 164 extend from the first end 156 along the wall 152. The threads 164 mate with internal threads 166 (FIG. 8) along the inner wall 136 in the first sleeve 122.

Still in reference to FIG. 11, the second sleeve 148 includes a head 168 and a body 170. The head 168 has a region of larger dimension than the body 170. In the example shown, the body 170 has a diameter that is smaller than the area of smallest dimension across the head 168. A shoulder 172 is between the head 168 and the body 170.

In the example shown, the threads 164 can extend along the external wall 152 from the first end 156 until the shoulder 172. The shoulder 172 can engage against and form a stop 174 (FIG. 4) against an axial end surface 166 (FIG. 8) of the second end 126 of the first sleeve 122.

In FIGS. 9 and 10, it can be seen how the head 168 includes a pair of rounded regions 178, 179 separated by a pair of flat sections 180, 181. The flat sections 180, 181 provide a mating surface for a tool to tighten the head 168 and/or engage the connection mechanism Along the internal wall 154 of the head 168 of the second sleeve 148 is located the inwardly extending region 160 that helps to seat and hold the seal member 118.

Still in reference to FIGS. 9 and 11, the second sleeve 148 includes an axial surface 182 at the first end 156. When the second sleeve 148 is operably attached to the first sleeve 122, the axial surface 182 forms a holding surface 184 (FIG. 4). For example, as can be seen in the embodiment of FIG. 4, the spring 116 is held within and compressed between washer 186 on the second sleeve 148 and spring seat 132 in the first sleeve 122.

Figure 6:
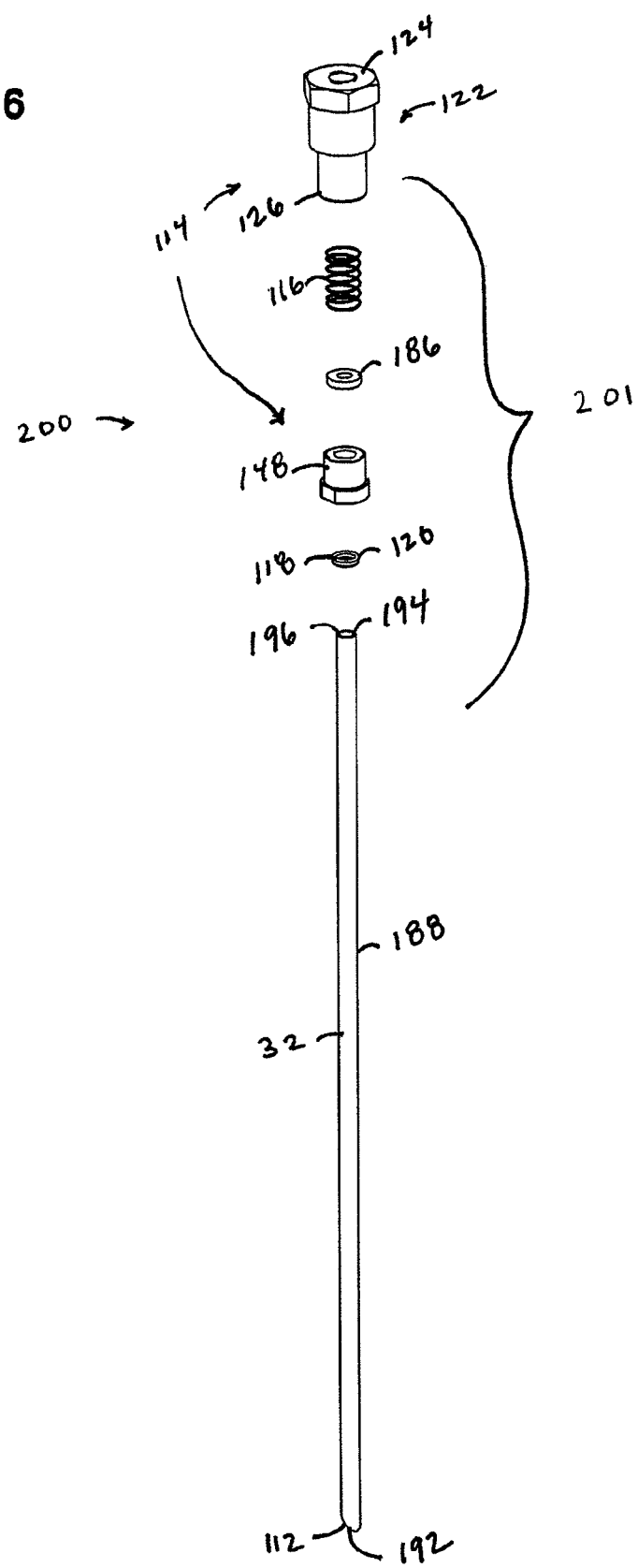
FIG. 6 is an exploded perspective view of a scavenge tube arrangement used in the assembly of FIGS. 1-5.

In one preferred arrangement, there is a spacer 186 (FIGS. 4 and 6). The spacer 186, in the embodiment shown, allows for the scavenge tube 32 to engage against the force of the spring 116.

The scavenge tube 32, in the example shown in FIG. 6, is generally a metal tube 188 having a hollow interior 190 (FIG. 4). The inlet end at 112 is the end that projects into the liquid collection region 64 of the filter member 24. In the example shown, the inlet end 112 may not be flat or even, but include an angled and non-blunt end 192. The end opposite of the inlet end 112 forms a fitting engagement end 194. A fitting engagement end 194 removably and slideably attaches to the fitting 114.

An axial end surface 196 (FIG. 4) of the fitting engagement end 194, in the embodiment shown, engages against the spacer 186 and against the force of the spring 116. In this manner, the scavenge tube 32 can be slideably pushed by force between the second end cap 68 on the inlet end 112 of the scavenge tube 32 and against the spring 116. The scavenge tube 32 is allowed to slide within the interior 150 of the second sleeve 148 and against the spacer 186 and spring 116. The spring 116 is biased to the pushing the scavenge tube 32 against the second end cap 68 to help ensure that the scavenge tube 32 is always in engagement with the second end cap 68 and within the liquid collection region 64.

Thus, filter head 22 for a gas liquid separator filter member can include housing 38 having an inlet arrangement 40 to convey gas to be filtered; an outlet arrangement 42 to convey filtered gas; at least one mounting stub 48 adapted to receive filter member 24 for filtering the gas; and a liquid return port 44. Spring-biased scavenge tube 32 is attached to the housing 38 and is in communication with the liquid return port 44.

Thus, gas liquid filter assembly 20 can include filter member 24 having a liquid collection region 64; filter head 22; the filter head 22 including filter head housing 38 having inlet arrangement 40 to convey gas to be filtered by the filter member 24; outlet arrangement 42 to convey filtered gas from the filter member 24; at least one mounting stub 48 removably secured to the filter member 24; and a liquid return port 44. Spring-biased scavenge tube 32 is attached to the filter head housing 38 and in communication with the liquid return port 44; the scavenge tube 32 projecting into a the liquid collection region 64 of the filter member 24.

A method for assembling a gas liquid separator assembly 20 can include providing filter head 22 including a filter head housing 38 with inlet arrangement 40, outlet arrangement 42, at least one mounting stub 48, and a liquid return port 44; operably mounting filter member 24 onto the mounting stub 48, the filter member 24 including closed end; and while mounting the filter member 24 onto the mounting stub 48, engaging scavenge tube 32 attached to the filter head housing 38 against the closed end of the filter member 24 and against spring 116 secured to the filter head housing 38.

2. Grounding Tube 36

As mentioned previously, and independent of other features, the filter assembly 20 can include grounding tube 36. In many implementations, it is desirable for the filter member 24 to be electrically grounded to the filter head 22. The filter head 22 will often be electrically grounded through its connection to the remaining portions of the assembly. In order to ground the filter member 24, metal to metal contact between the filter member 24 and the electrically grounded filter head 22 is desired. In an example shown, the grounding tube 36 includes the metal tube 36 that is slideably attached to the filter head 142 and is in touching engagement with a metal portion of the filter member 24 to ground the filter member 24 to the filter head 22.

In the embodiment shown in FIG. 3, the grounding tube 36 is in touching engagement with the second end cap 68. The second end cap 68 is preferably made from metal, so that the metal to metal contact is made between the grounding tube 36 and the filter member 24.

In the example embodiment illustrated, the grounding tube 36 is spring-biased by the spring 116, described above. The spring 116 directs a force against the grounding tube 36 to ensure that the grounding tube 36 is always in touching engagement with the second end cap 68, and thus, is grounding the filter member 24 to the filter head 22. In example preferred embodiments, the grounding tube 36 can also function as the scavenge tube 32.

The filter assembly 20, thus, can include filter member 24 including a liquid collection region 64; filter head 22 releasably secured to the filter member 24; the filter head 22 including a filter head housing 38 having an inlet arrangement 40 to convey fluid to be filtered by the filter member 24; an outlet arrangement 42 to convey filtered fluid from the filter member 24; the filter head 22 being electrically grounded; and spring-biased grounding tube 36 attached to the filter head housing 38 and projecting into the liquid collection region 64 of the filter member 24 and in touching engagement with a metal portion of the filter member 24 to ground the filter member 24 to the filter head 22.

3. Scavenge Tube Arrangement

FIG. 6 illustrates a scavenge tube arrangement 200. The arrangement 200 can be part of a kit 201 used to service parts of a filter assembly 20. The arrangement 200 can include fitting 114, scavenge tube 32, and seal member 118. The fitting 114 can include first sleeve 122. It may also include second sleeve 148, in which the second sleeve 148 is attached to the second end 126 of the first sleeve 122.

In some embodiments, the arrangement 200 can further include spacer 186 and spring 116.

In some embodiments, the arrangement 200 may include a second spacer 187 (FIG. 4) for placement between the spring 116 and the spring seat 132.

Thus, the scavenge tube arrangement 200 can include fitting 114 having opposite open ends 124, 126 and an open tube 130 therebetween; spring 116 operably held within the open tube 130; a scavenge tube 32 slidably held within the open tube 130 and against the spring 116; and a seal member 118 held by the fitting 114 and forming a seal between the scavenge tube 32 and the fitting 114.

4. Vessel—FIG. 12

Figure 12:
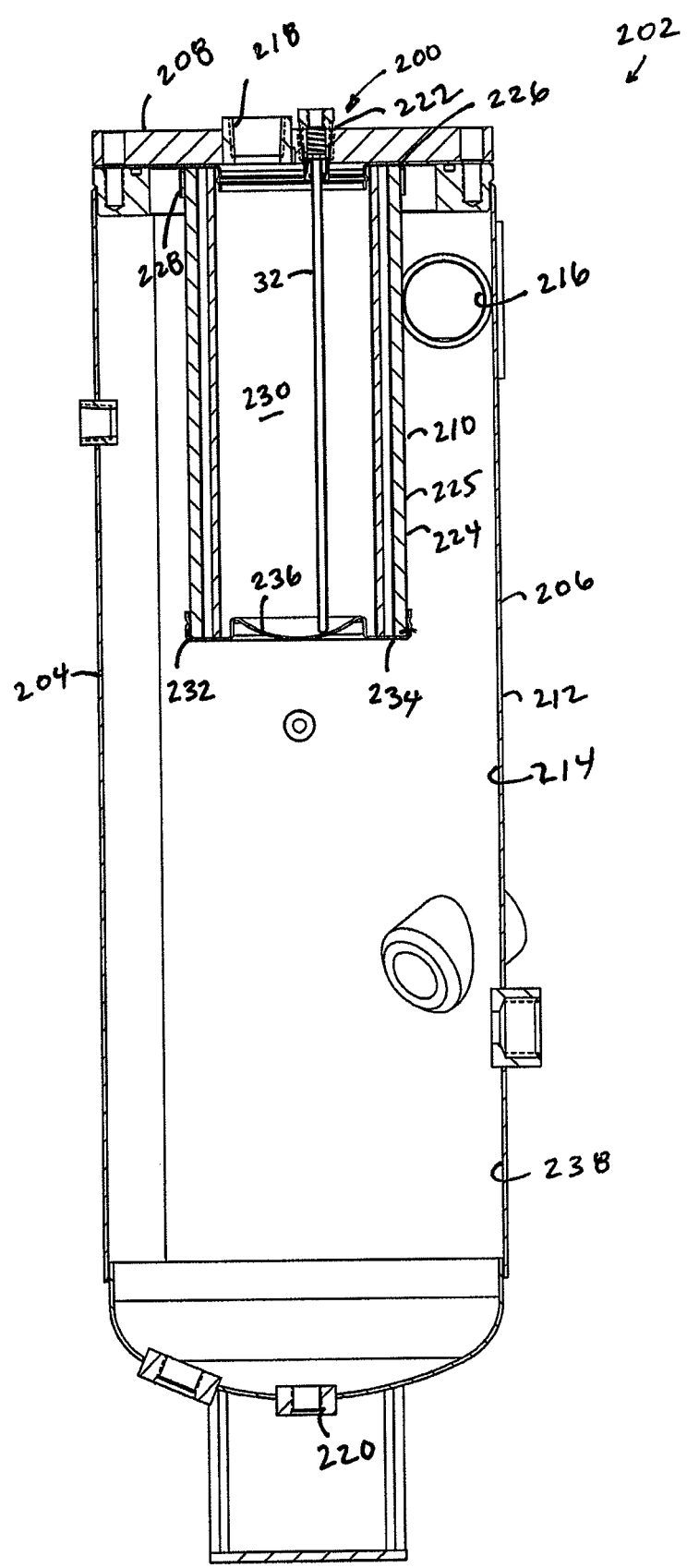
FIG. 12 is a cross sectional view of the scavenge tube arrangement utilized in the previous FIGS, but shown used in a tank instead of a filter head, constructed in accordance with the principles of this disclosure.

It should be understood that the scavenge tube arrangement 200 is usable in assemblies other than the filter assembly 20 including the filter head 22 with filter member 24. For example, FIG. 12 shows a gas liquid filter assembly 202 utilizing the scavenge tube arrangement 200. In FIG. 12, the assembly 202 includes a vessel 204. In general, the vessel 204 includes a housing 206 and a cover 208. An internally received and removable and replaceable serviceable filter member 210 is within the housing 206.

The vessel 204 includes an outer wall 212 defining open interior 214. The filter member 210 is located within the interior 214. The vessel 204 also includes a gas flow inlet 216, a gas flow outlet 218, and a liquid drain outlet 220. There is further a liquid return port 222, analogous to the liquid return port 44, described in connection with FIGS. 1-3.

As can be seen in this example, the cover 208 defines the outlet 218 and the liquid return port 222.

As indicated, the filter member 210 is removable and replaceable from the assembly 202. The filter member 210 includes media pack 224, in this example, a cylindrical media pack 225, secured at one end 226 to an end cap 228. The end cap 228, in this embodiment, is an open end cap 228, to allow for gas flow communication from interior volume 230 within the filter member 210 through the gas flow outlet 218. The open end cap 228 also allows for passage of the scavenge tube 32 there through.

At end 232 opposite of the end cap 228, the filter member 210 includes a closed end cap 234. The closed end cap 234, within the interior volume 230 of the media pack 224, defines the liquid collection region 236. Operation of the scavenge tube arrangement 200 is analogous to that the described above with respect to filter assembly 20.

In operation, unfiltered gas enters the assembly 202 through inlet 216. The unfiltered gas can be, for example, an air oil mixture. From the inlet 216, the unfiltered air flows through the media pack 224 and into the interior volume 230. The media pack 224 can include media, as characterized above with respect to filter assembly 20. The media pack 224 helps to remove particulate and helps to separate and coalesce liquid, such as oil, from the gas. Some of the liquid will be removed from the unfiltered gas upstream of the media pack 224, and collect within sump 238 within the vessel 204. Some of the liquid will not be removed from the gas until the downstream side of the media pack 224. That liquid will collect within the liquid collection region 236. The collected liquid within the liquid collection region 236 will be removed by the scavenge tube 32 and conveyed through the liquid return port 222. The clean filtered gas will exit the vessel 204 through the outlet 218.

Thus, gas liquid filter assembly can include vessel 204 including an outer wall 212 and having a fluid flow inlet 216, a fluid flow outlet 218, and a liquid return port 222; filter member 210 is operably oriented within the vessel 204; the filter member 210 has liquid collection region 236; and a spring-biased scavenge tube 32 in communication with the liquid return port 222 and projecting into the liquid collection region 236 of the filter member 210.

B. The Embodiment of FIGS. 13-16

Figure 13:
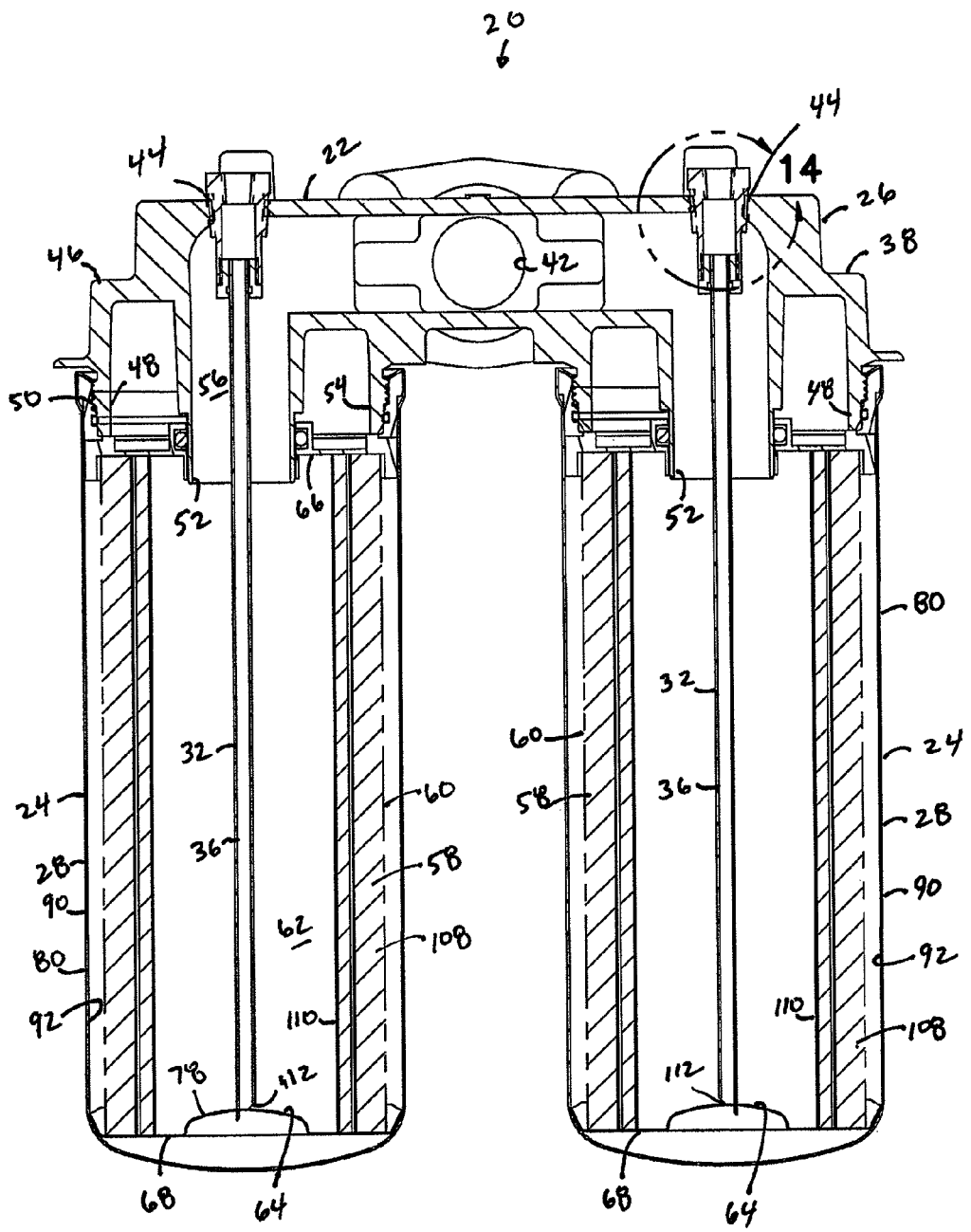
FIG. 13 is a cross sectional view of a filter assembly utilizing a second embodiment of a scavenge tube arrangement, constructed in accordance with principles of this disclosure.
Figure 14:
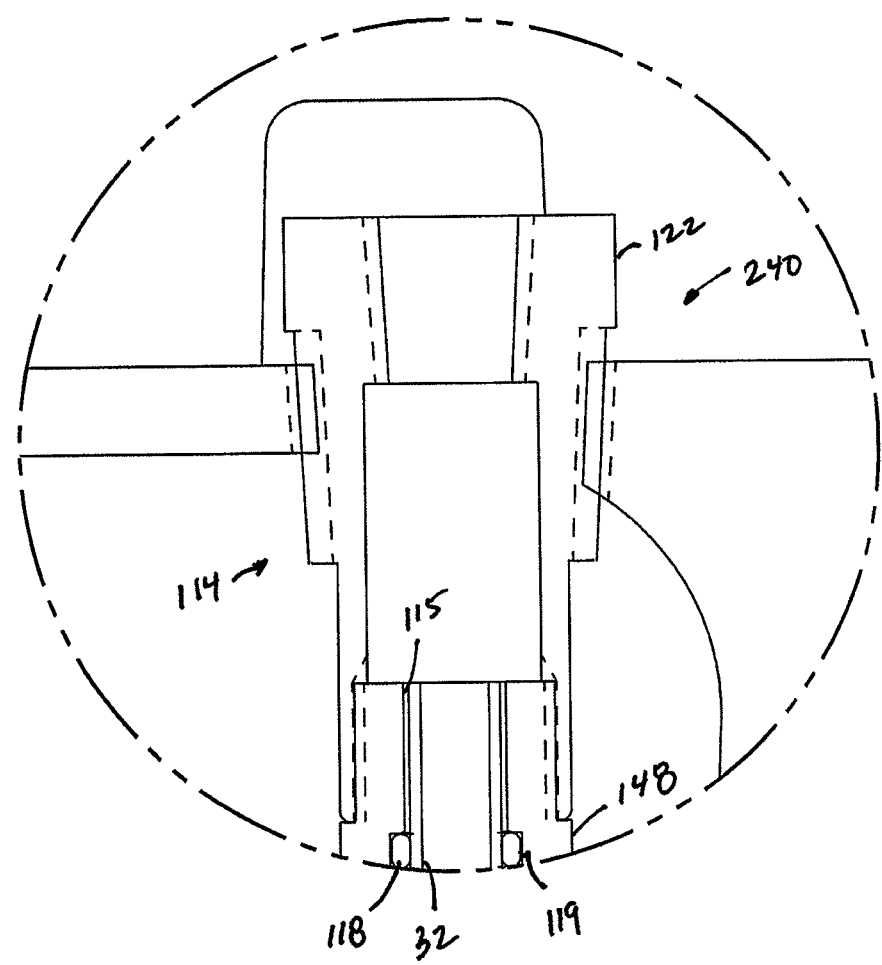
FIG. 14 is an enlarged view of the section 14-14 shown in FIG. 13.
Figure 15:
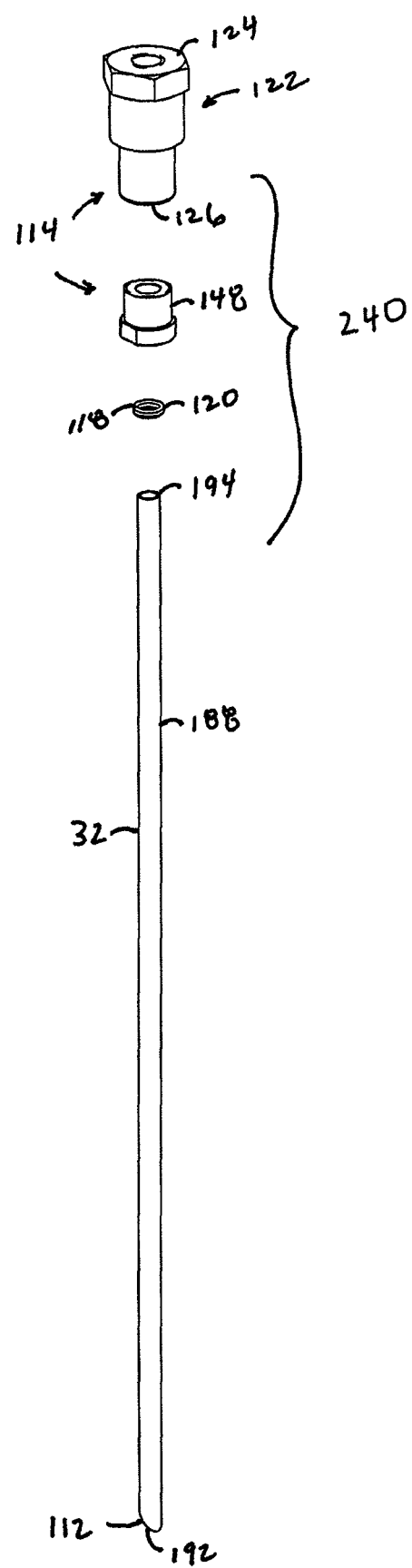
FIG. 15 is an exploded, perspective view of the second embodiment of the scavenge tube arrangement used in the assembly of FIGS. 13 and 14.

FIGS. 13-16 depict a second embodiment of a scavenge tube arrangement, shown generally in FIG. 15 at 240. The scavenge tube arrangement 240 is used in filter assemblies and has parts that are the same as that described above in respect to the embodiment of FIGS. 1-13. Thus, the same reference numerals are used for analogous parts, and the description of those parts is incorporated herein in this section by reference.

First, in reference to FIG. 13, filter assembly 20 is depicted including filter head 22. The filter head 22 includes housing 38 with inlet arrangement 40 (FIG. 2) and outlet arrangement 42. There is at least one mounting stub 48 adapted to receive filter member 24. The housing 38 also includes liquid return port 44. As with the example of FIG. 3, in this arrangement, the filter head 22 is a double head 26, which receives two filter heads 24. The scavenge tube 32 is slideably attached to the housing 38 and in communication with the liquid return port 44.

In comparing the embodiment of FIGS. 13 and 14 to the embodiment of FIGS. 3 and 4, one can appreciate, that in both embodiments, the scavenge tube 32 is slideably attached to the housing 38 and in communication with the liquid return port 44. However, in the embodiments of FIGS. 13 and 14, the scavenge tube 32 is not mechanically-biased, as the embodiments of FIGS. 3 and 4 is. Rather, the scavenge tube 32 in the embodiment of FIGS. 13 and 14 is slideably attached to the filter head 22 and will slide relative to the head 22 when the filter member 24 is being secured to the filter head 22.

When attaching the filter member 24 to the filter head 22, the scavenge tube 32 is initially manually adjusted so that the scavenge tube 32 extends a length longer than the distance between the liquid return port 44 and the second end cap 68. In this way, as the filter member 24 is being attached to the head 22, the second end cap 68 will be in contact with the inlet end 112 of the scavenge tube 32. As the filter member 24 moves axially closer to the filter head 22 as it is being attached, it will push the scavenge tube 32 slideably and axially toward the housing 38 of the filter head 22.

As with the previous embodiments, the scavenge tube 32 can act, independent of the above, as grounding tube 36. The function of grounding tube 36 to ground the filter member 24 to the filter head 22 is independent of the function as a scavenge tube 32.

In reference now to FIGS. 14 and 15, the scavenge tube arrangement 240 of this embodiment is described further. The scavenge tube arrangement 240 includes fitting 114, scavenge tube 32 slideably held within the open interior 115 of the fitting 114, and seal member 118 held by the fitting 114 and forming a seal 119 between the scavenge tube 32 and the fitting 114.

In this embodiment, the fitting 114 can include first sleeve 122 and second sleeve 148. In this example embodiment, the scavenge tube arrangement 240 includes no more and consists of fitting 114, seal member 118, and scavenge tube 32. In this embodiment, the fitting can include both the first sleeve 122 and second sleeve 148. Alternative arrangements are possible.

Figure 16:
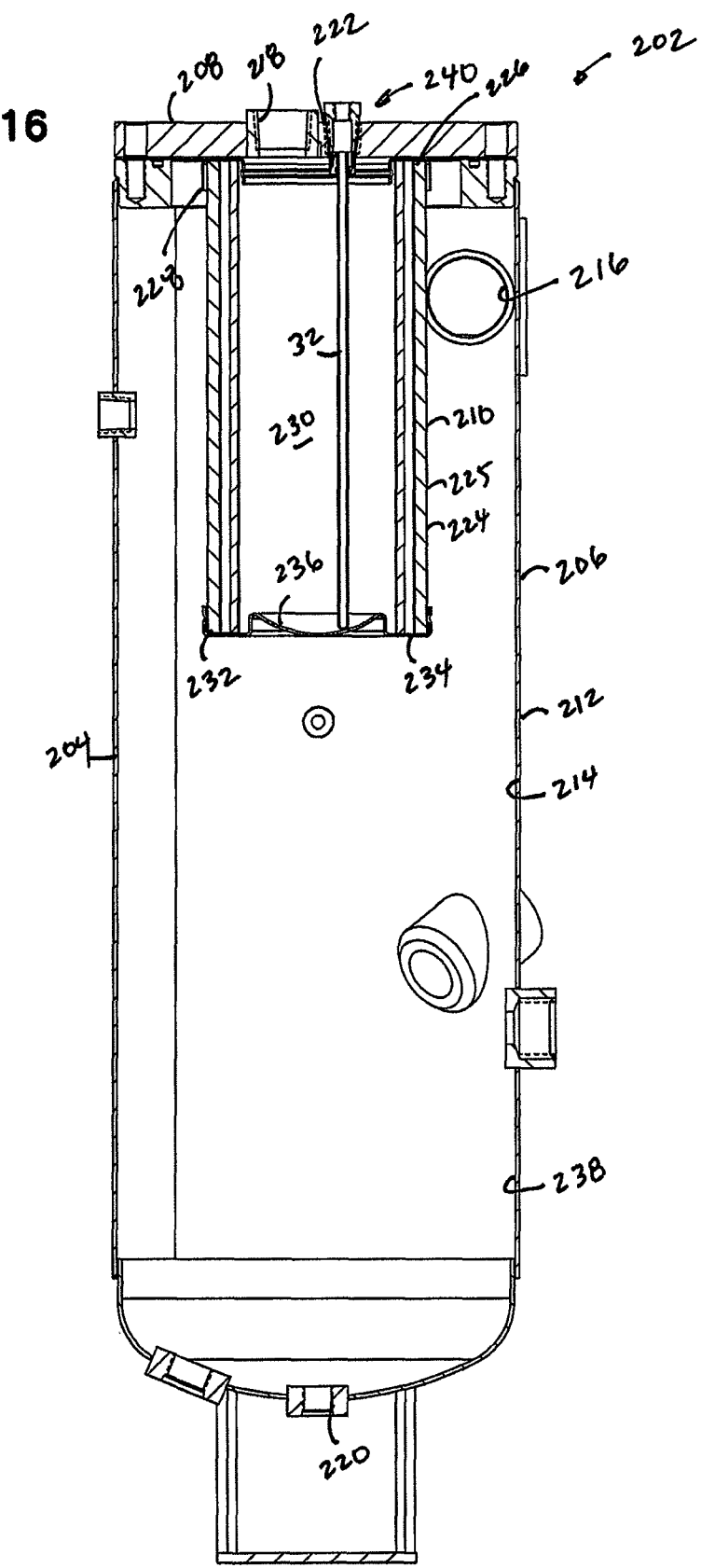
FIG. 16 is a cross sectional view of the scavenge tube arrangement of FIGS. 13-15 but shown used in a tank instead of a filter head, constructed in accordance with principles of this disclosure.

In FIG. 16, the scavenge tube arrangement 240 is depicted as being used with filter assembly 202. The parts described with respect to FIG. 12 are analogous and carry the same reference numerals and descriptions herein. The scavenge tube arrangement 240 is shown in which the scavenge tube 32 is slideably held in communication with the liquid return port 222 and projecting into the liquid collection region 236 of the filter member 210.

Thus, filter head 22 for a gas liquid separator filter member can include housing 38 having an inlet arrangement 40 to convey gas to be filtered; an outlet arrangement 42 to convey filtered gas; at least one mounting stub 48 adapted to receive filter member 24 for filtering the gas; and a liquid return port 44. A scavenge tube 32 is slideably attached to the housing 38 and is in communication with the liquid return port 44.

Gas liquid filter assembly 20 can include filter member 24 having a liquid collection region 64; filter head 22; the filter head 22 including filter head housing 38 having inlet arrangement 40 to convey gas to be filtered by the filter member 24; outlet arrangement 42 to convey filtered gas from the filter member 24; at least one mounting stub 48 removably secured to the filter member 24; and a liquid return port 44. Scavenge tube 32 is slideably attached to the filter head housing 38 and in communication with the liquid return port 44; the scavenge tube 32 projecting into a the liquid collection region 64 of the filter member 24.

A method for assembling a gas liquid separator assembly 20 can include providing filter head 22 including a filter head housing 38 with inlet arrangement 40, outlet arrangement 42, at least one mounting stub 48, and a liquid return port 44; operably mounting filter member 24 onto the mounting stub 48, the filter member 24 including closed end; and while mounting the filter member 24 onto the mounting stub 48, engaging scavenge tube 32 attached to the filter head housing 38 against the closed end of the filter member 24 and against a slideable connection with the filter head housing 38.

C. Methods

A method for assembling a gas liquid separator assembly can be implemented utilizing the arrangements described above. In general, either a filter head or a vessel having a cover can be provided. A filter member is operably mounted to the filter head or within the vessel. The filter member will include a closed end. While mounting the filter member onto the filter head or within the vessel, there is a step of engaging a scavenge tube attached to either the filter head or the cover of the vessel and against the closed end of the filter member and against a slideable connection with either the filter head or the cover of the vessel.

A method for replacing a scavenge tube in a gas liquid separator filter is provided. The old scavenge tube assembly is removed and replaced with a scavenge tube arrangement including a fitting having opposite open ends and an open interior there between; a scavenge tube that can be slideably held within the open interior of the fitting; and a seal member that can be held by the fitting and form a seal between the scavenge tube and the fitting.

In one implementation, the method may include providing a spring, such that the spring can be located within the fitting interior and orientated to bias axially against the scavenge tube.

In one implementation, the fitting can include a first sleeve and a second sleeve, which are releasably attachable together.

A method for grounding a filter member to a filter assembly includes providing a vessel or filter head that is electrically grounded and then operably securing a filter member to the filter head or the cover of the vessel, and using a slideable grounding tube attached to the filter head or to the cover. The slideable grounding tube will project into a liquid collection region of the filter member and be in touching engagement with a metal portion of the filter member to ground the filter assembly.

The above specification provides examples of principles of this disclosure. Many embodiments can be made.

What is claimed is:

1. A filter head for a gas liquid separator filter member; the filter head comprising:
   (a) a housing having an inlet arrangement to convey gas to be filtered; an outlet arrangement to convey filtered gas; at least one mounting stub adapted to receive a filter member for filtering the gas; and a liquid return port; and
   (b) a scavenge tube slidably attached to the housing and in communication with the liquid return port.

2. The filter head of claim 1 wherein:
   (a) the scavenge tube is within the outlet arrangement of the housing.

3. The filter head claim 1 wherein:
   (a) the scavenge tube is attached to the housing with a fitting; the fitting holding the scavenge tube.

4. The filter head of claim 3 further comprising:
   (a) a seal member held by the fitting and forming a removable seal between the fitting and the scavenge tube.

5. The filter head of claim 4 wherein:
   (a) the seal member comprises an O-ring seal member.

6. The filter head of claim 3 wherein:
   (a) the fitting includes a first sleeve having opposite first and second ends, and an open interior.

7. The filter head of claim 6 wherein:
   the fitting includes a second sleeve attached to the second end of the first sleeve; the second sleeve having an open interior sized to removably accommodate the scavenge tube;
   (i) the seal member being held within the open interior of the second sleeve.

8. The filter head of claim 7, further comprising a connection mechanism.

9. The filter head of claim 6 wherein:
   (a) the first end of the first sleeve is threaded and sized to accommodate an liquid return line.

10. The filter head of claim 8 wherein:
    (a) the connection mechanism includes a threaded connection between the second sleeve and the second end of the first sleeve.

11. The filter head of claim 8 wherein:
    (a) the connection mechanism includes a press fit between the second sleeve and the second end of the first sleeve.

12. The filter head of claim 8 wherein:
    (a) the connection mechanism includes an interference fit between the second sleeve and the second end of the first sleeve.

13. The filter head of claim 1 wherein:
    (a) the scavenge tube is biased with a biasing mechanism.

14. The filter head of claim 13 wherein:
    (a) the scavenge tube is attached to the housing with a fitting; the fitting holding a scavenge tube;
    (b) a seal member held by the fitting and forming a removable seal between the fitting and the scavenge tube;
    (c) the fitting includes a first sleeve having opposite first and second ends, an open interior, and a seat in the interior;
       (i) the biasing mechanism being mounted in the interior of the first sleeve on the seat.

15. The filter head of claim 1 wherein;
    (a) the at least one mounting stub defines outwardly directed threads adapted to mate with the filter member.

16. The filter head of claim 1 wherein:
    (a) the at least one mounting stub includes two mounting stubs each adapted to receive a filter member for filtering the gas; and
    further comprising
    (b) a second liquid return port in the housing; and
    (c) a second scavenge tube slidably attached to the housing and in communication with the second liquid return port.

17. A gas liquid filter assembly comprising;
    (a) a filter member having a liquid collection region;
    (b) a filter head; the filter head including a filter head housing having an inlet arrangement to convey gas to be filtered by the filter member; an outlet arrangement to convey filtered gas from the filter member; at least one mounting stub removably secured to the filter member; and a liquid return port; and
    (c) a scavenge tube slidably attached to the filter head housing and in communication with the liquid return port; the scavenge tube projecting into a the liquid collection region of the filter member.

* * * * *